United States Patent [19]
Wallace

[11] 3,752,535
[45] Aug. 14, 1973

[54] CONTROL VALVE AND SYSTEM
[75] Inventor: Eugene E. Wallace, Kirkwood, Mo.
[73] Assignee: Wagner Electric Corporation, Newark, N.J.
[22] Filed: Apr. 17, 1972
[21] Appl. No.: 244,764

[52] U.S. Cl. ................ 303/6 C, 188/152, 303/84 A
[51] Int. Cl. ............................................... B60t 8/26
[58] Field of Search ...................... 303/6 C, 84 A; 188/152

[56] References Cited
UNITED STATES PATENTS
| | | | |
|---|---|---|---|
| 3,637,963 | 1/1972 | Wellman | 303/6 C X |
| 3,498,681 | 3/1970 | Bueler | 303/6 C |
| 3,508,793 | 4/1970 | Bueler | 303/6 C |
| 3,556,607 | 1/1971 | Shutt et al. | 303/6 C |

Primary Examiner—M. Henson Wood, Jr.
Assistant Examiner—Michael Mar
Attorney—Joseph E. Papin

[57] ABSTRACT

A control valve is provided with a proportioning valve movable therein for performing proportioning operations on one of separate fluid pressure supplied thereto, and said proportioning valve is provided with an effective area for subjection to the supplied fluid pressures, said proportioning valve being operable to perform its proportioning operation effecting a reduced application through said control valve of one of the supplied fluid pressures only in the event of the failure of the other of the supplied fluid pressures acting on said area. A warning device may also be provided in the control valve including means for comparing the magnitudes of the supplied fluid pressure and actuated between a normal position and one of opposed translated positions upon the failure of the other supplied fluid pressure. The invention also comtemplates a fluid pressure system having a dual master cylinder therein for generating the supplied fluid pressures and connected through the control valve to a pair of brakes, one of said brakes being energized only in response to the one supplied or applied fluid pressure respectively acting thereon and the other of said brakes being energized in response to both the one and other supplied fluid pressures acting thereon.

19 Claims, 5 Drawing Figures

CONTROL VALVE AND SYSTEM

FIELD OF THE INVENTION

This invention relates in general to split or dual brake systems and in particular to a control valve for use in said system.

BACKGROUND OF THE INVENTION

In the past, as well-known in the art, the braking capacity between the front and rear axle brakes of a truck or tractor for use with a trailer was usually balanced or divided so that the front axle brakes accomplished approximately 25 to 35 percent of the braking effort and the rear axle brakes accomplished the other 65 to 75 percent of such braking effort in order to prevent early front brake lock-up resulting in front wheel skidding during braking application. To meet the requirements of new Federal Regulations, it will be necessary, in the near future, to significantly increase the braking or torque capabilities of the front axle brakes thereby greatly increasing the tendency or potential for early lock-up of the front axle brakes which will, of course, cause front wheel skidding. The past dual, tandem or split brake systems for trucks were sometimes provided with front axle brakes connected in one branch of such dual system and energized in response to supplied fluid pressure generated therein by a dual, tandem or split fluid pressure generating device, and the rear axle brakes were each provided with dual, tandem or split fluid pressure responsive motors which were connected in both the front and rear branches being responsive to the supplied fluid pressures therein for energizing the rear brakes, respectively, thereby effecting a horizontal split in only said rear branch of said dual system. One of the disadvantageous or undesirable features of the above discussed past brake systems was that upon the failure of the supplied fluid pressure directed only to one of the split motors of the rear axle brakes, the front axle brakes then assumed a greater proportion of the braking effort resulting in an increased tendency for front brake lock-up to produce front wheel skidding as well as deleteriously affecting steerability of the vehicle.

The principle object of the present invention is to provide a brake system and a control valve for use therein which overcomes the aforementioned disadvantageous or undesirable feature, as well as others, and this, as well as other objects and advantageous features of the present invention, will become apparent in the specification which follows.

SUMMARY OF THE INVENTION

Briefly, the present invention includes a control valve having modulating means for performing modulating operations on one of separate fluid pressures supplied thereto including an effective area for respective subjection to each of the supplied fluid pressures, said modulating means being only operable to modulate said one supplied fluid pressure only in the event of the failure of the other of the supplied fluid pressures. The present invention also contemplates means for comparing the magnitudes of the supplied fluid pressures and movable in the control valve between a normal position and one of opposed translated positions upon the failure of the other supplied fluid pressure. A fluid pressure system is also included in the invention having dual fluid pressure generating means for generating the supplied fluid pressures and connected through said control valve to a pair of friction devices, one of said friction devices being energized only in response to the one supplied or modulated fluid pressure and the other of said friction devices being energized in response to both the one and other fluid pressures acting thereon.

BRIEF DESCRIPTION OF THE DRAWINGS

In the drawings which illustrate embodiments of the invention and wherein like numerals refer to like parts wherever they occur.

DETAILED DESCRIPTION OF THE INVENTION

Figure 1:
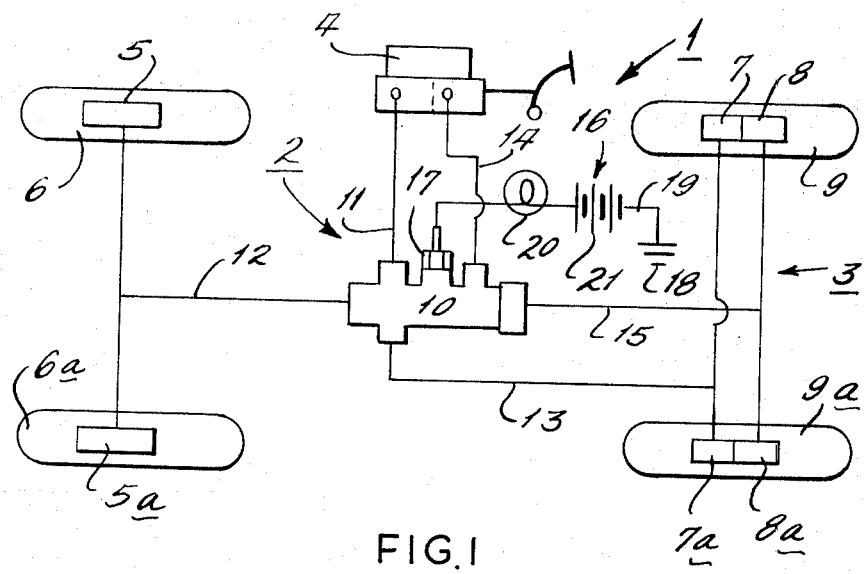
FIG. 1 is a schematic view of a split brake system embodied in the present invention.

Referring now to the drawings in detail and in particular to FIG. 1, a dual fluid pressure system, such as the partially horizontally split brake system illustrated generally at 1 and adapted for use on a vehicle, is provided with separate branches or circuits 2, 3 connected between the separate primary and secondary or pair of fluid pressure generating chambers (not shown) of a tandem dual or split master cylinder 4 and between fluid pressure responsive motors or wheel cylinders 5, 5a of a pair of front axle set of friction devices or brakes 6, 6a and fluid pressure responsive motors or dual or split wheel cylinders 7, 8 and 7a, 8a of a pair of rear axle set of friction devices or brakes 9, 9a, respectively, and a control valve 10 is interposed in said branches. In the system branch 2 a conduit 11 is connected between one of the fluid pressure generating chambers of a split master cylinder 4 and an inlet port of the control valve 10, and another conduit 12 has one end connected with an outlet port of said control valve while the other end thereof branches to connect with wheel cylinders 5, 5a of the front brakes 6, 6a. Another conduit 13 has one end connected with another outlet port of the control valve 10 while the other end thereof branches to connect with the wheel cylinders 7, 7a of the rear brakes 9, 9a, resprectively; however, it is obvious that the conduit 13 could alternatively be connected with the conduit 11 without said control valve instead of being connected with said outlet port thereof, if desired. In the branch 3 a conduit 14 is connected between the other of the fluid pressure generating chambers of the split master cylinder 4 and another inlet port of the control valve 10, and another conduit 15 has one end connected with another outlet port of said control valve while the other end thereof branches to connect with the split wheel cylinders 8, 8a of the rear brakes 9, 9a, respectively; however, it is obvious that the conduit 15 could alternatively be connected with the conduit 14 without said control valve instead of being connected with said outlet port thereof, if desired. The front and rear brakes 6, 6a and 9, 9a are balanced or designed in such a manner that said rear brakes provide a greater braking effort or torque than said front brakes during a braking application. To complete the description of the system 1, an electrical circuit, indicated generally at 16, is provided with an electric switch or mechanism 17 of the circuit making or breaking type well-known in the art which is connected in the control valve 10, as described hereinafter, and said electric switch is connected to ground at 18 by an electrical lead 19 having a driver warning device or lamp 20 and a battery 21 serially connected therein.

Figure 2:
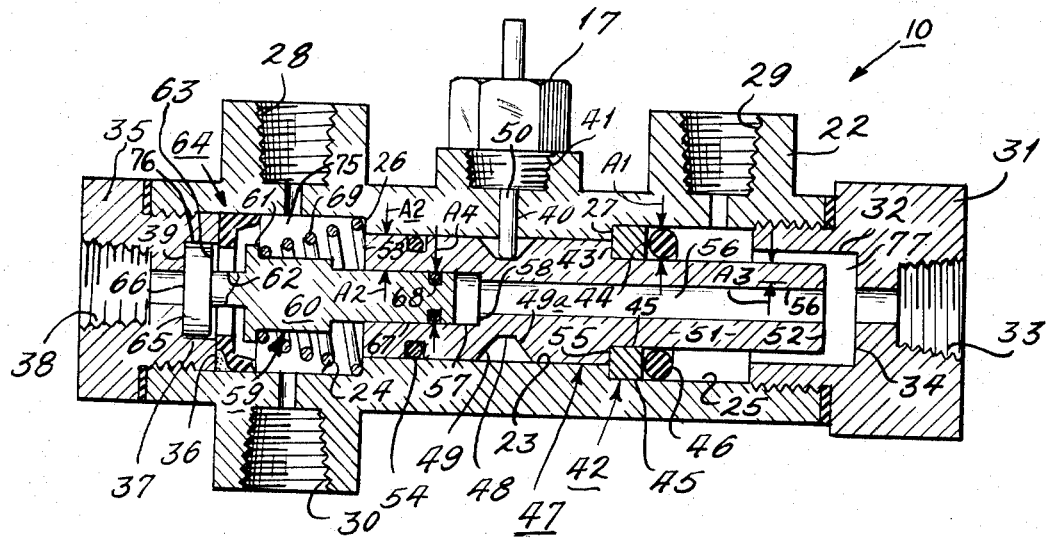
FIG. 2 is a sectional view illustrating the control valve of FIG. 1 also embodied in the present invention in cross-section.

Referring now to FIG. 2, the control valve 10 is provided with a housing 22 having a bore 23 therein interposed between opposed counterbores 24, 25, and opposed annular shoulders or abutments 26, 27 are provided on said housing at the juncture of said bore and counterbores, respectively. A pair of inlet ports 28, 29 which receive the conduits 11, 14, as previously mentioned, are provided in the housing 22 intersecting with the counterbores 24, 25 adjacent to the mid-portions thereof, respectively, and an outlet port 30 which receives the conduit 13, as previously mentioned, is also provided in said housing intersecting with the counterbore 24 adjacent to the mid-portion thereof. A losure member or end plug 31 is threadedly received in the rightward or open end of the counterbore 25 having a bore 32 therein which connects with another outlet port 33 having an annular shoulder or abutment 34 therebetween, said outlet port receiving the conduit 15, as previously mentioned. Another closure member or end plug 35 is threadedly received in the leftward or open end of the counterbore 24 having an interior free end or abutment 36, and a bore 37 is interposed between said interior free end and another outlet port 38 which receives the conduit 12, as previously mentioned. An annular shoulder or abutment 39 is provided on the closure member 35 at the juncture of the bore 37 and the outlet port 38. A cross-bore 40 is also provided in the housing 22 having one end intersecting with the housing bore 23 adjacent to its midportion while the other end thereof connects with a threaded cross-counterbore 41 in which the electrical switch 17 is threadedly received, as previously mentioned.

A centering or return member, such as the annular piston indicated generally at 42 is slidably received in the housing counterbore 25 having opposed ends or abutment surfaces 43, 44 and an axially extending bore 45 is provided through said centering piston intersecting with the opposed ends thereof. A sealing member such as the O-ring 46 is sealably engaged between the housing counterbore 25 and the centering piston rightward end 44, and the centering piston leftward end 43 is normally engaged with the housing shoulder 27, said sealing member and centering piston rightward end defining an annular effective area $A_1$ subjected to the fluid pressure at the inlet port 29 at all times.

Comparator means, such as the reciprocal switch actuating member or piston indicated generally at 47, is slidably received in the housing bore 23, and an annular or peripheral groove means 48 is provided in said comparator piston defining opposed driving or camming surfaces or side walls 49, 49a immediately below the housing cross-bore 40 for driving engagement with a switch operating member 50 of the electrical switch 17 upon the translatory or reciprocating movement of said comparator piston from its centered or normal operating position as shown. The comparator piston 47 is provided with an integral reduced extension 51 which is slidably received in the centering piston bore 45 and extends coaxially through the O-ring 46 in sealing engagement therewith into the closure member bore 32, and a rightward or free end 52 is provided on said extension for abutting engagement with the closure member shoulder 34 to define the rightward translatory position of said comparator piston. The comparator piston 47 is provided with a leftward or free end 53 normally positioned adjacent to the housing shoulder 26, and a peripheral seal such as the O-ring 54 is carried in said proportioning piston adjacent to its leftward end in sealing engagement with the housing bore 23. The extension 51 defines with the comparator piston 47 an annular shoulder or abutment 55 thereon for driving or centering engagement with the centering piston leftward end 43, and an axial bore and counterbore 56, 57 having an annular shoulder or abutment 58 therebetween as provided in said comparator piston between the opposed ends 52, 53 thereof.

Figure 3:
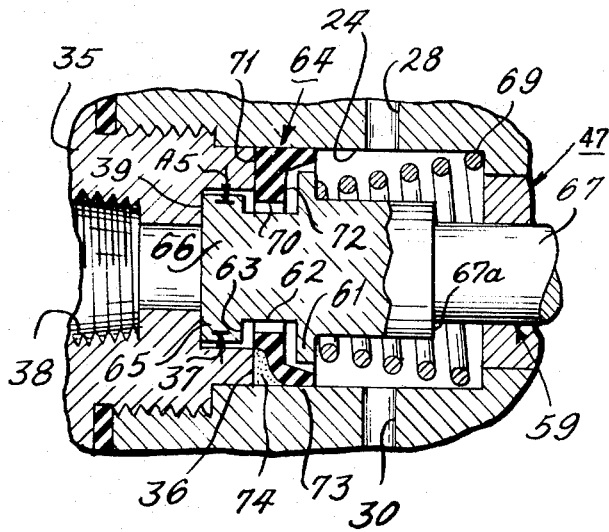
FIG. 3 is an enlarged fragmentry sectional view taken from FIG. 2 to further illustrate the seating member and proportioning valve thereof.

Referring now to FIGS. 2 and 3, a modulating metering or proportioning means, such as the piston member indicated generally at 59, is provided with annular head or metering portion 60 in the housing counterbore 24 having an annular radial flange or retainer portion 61 thereon, and peripheral groove means 62 is provided in said head portion defining an annular metering or proportioning shoulder or valve member 63 for metering engagement with a cooperating seating member, such as the annular seating or cup member indicated generally at 64 and discussed hereinafter. The proportioning piston 59 is also integrally provided with a reduced portion or extension means 65 on the leftward end thereof in sliding and guiding engagement with the closure member bore 37, and an abutment or free end portion 66 is provided on said extension means for abutting engagement with the closure member shoulder 39 to define the inoperative, static or at-rest position of said proportioning piston. Another opposed reduced portion or extension means 67 is integrally formed with the head portion 60 on the proportioning piston 59 defining an annular shoulder or abutment 67a thereon, and said extension 67 is slidably received in the counterbore 57 of the comparator piston 47. A peripheral sealing member or O-ring 68 is carried on the extension 67 in sealing engagement with the comparator piston counterbore 57, and a metering or proportioning spring 69 is precompressed in abutting engagement between the housing shoulder 26 and the proportioning piston retainer 61 normally urging the proportioning piston 59 toward its normal or inoperative position engaging the end 66 thereof in abutment with the closure member shoulder 39.

The seating member 64 is provided with a centrally located aperture 70 extending axially therethrough between opposed side portions 71, 72 of said seating member and radially spaced from the groove 62 of the proportioning piston 47. The seating member side 71 is normally seated in abutting engagement with the interior end 36 of the closure member 35 and also defines a valve seat about the seating member aperture 70 for metering engagement with the metering valve member 63 of the proportioning piston 47. The seating member 64 is also provided with a peripheral lip 73 in sealing engagement with the housing counterbore 24, and a plurality of axially extending return flow passages 74 are provided between the seating member side 71 and lip 73, said return flow passages being normally closed by the sealing engagement of said lip with said housing counterbore.

An inlet chamber 75 is provided in the housing counterbore 24 generally between the sealing engagement of the proportioning piston valve member 63 with the seating member valve seat 71, as discussed hereinafter, and the housing shoulder 26 and comparator piston end 53, and said inlet chamber is connected in pressure fluid communication with the inlet port 28 at all times. An outlet chamber 76 is provided in the closure member bore 37 between the sealing engagement of the proportioning piston valve member 63 and the seating member valve seat 71, and the closure member shoulder 39, and said outlet chamber is connected in pressure fluid communication with the outlet port 38 at all times. Another inlet chamber 77 is provided in the housing counterbore 25 between the centering piston O-ring 46 and the closure member 31, and said inlet chamber is connected in pressure fluid communication with the inlet port 29 at all times.

It should be noted that the comparator piston 47 is provided with an annular effective area $A_2$ on the leftward end 53 thereof defined between the sealing engagements of the comparator and proportioning piston seals 54, 68 with the housing bore 23 and comparator piston counterbore 57, respectively, and the area $A_2$ is subjected to fluid pressure in the inlet chamber 75 at all times. Another annular effective area $A_3$ is also provided on the comparator piston 47 defined between the sealing engagements of the centering and proportioning piston seals 46, 68 with the comparator piston extension and counterbore 51, 57, respectively, and the area $A_3$ is subjected to fluid pressure in the inlet chamber 77 at all times. The area $A_3$ is opposed to and predeterminately less than the area $A_2$ while also being additive to the area $A_1$ of the centering piston 42, and the sum of the additive areas $A_1$, $A_3$ is greater than the opposing area $A_2$. The proportioning piston 59 is provided with a closing area $A_4$ defined by the sealing engagement of the proportioning piston seal 68 with the comparator piston counterbore 57, and the area $A_4$ is subjected to both the fluid pressures in the inlet chamber 77 and the outlet chamber 76 to normally establish opposed self-cancelling forces, as discussed hereinafter. To complete the description of the control valve 10, the sealing engagement of the valve member 63 of the proportioning piston 59 with the valve seat 71 of the seating member 64 defines another area $A_5$ on said proportioning piston which is also subjected to the fluid pressure in the outlet chamber 76.

OPERATION

Assuming the component parts of the system 1 and control valve 10 to be in their normal operating positions, as shown in the drawings, manual operation of the split system master cylinder 4 creates input or supplied fluid pressures $P_1$, $P_2$ having substantially the same magnitude in the primary and secondary fluid pressure generating chambers thereof (not shown) as well-known in the art, and the supplied fluid pressure $P_1$ is transmitted through the conduit 11 and the inlet port and chamber 28, 75 of the control valve 10 to establish an output or applied fluid pressure Po in the outlet port and chamber 38, 76 which is transmitted therefrom through the conduit 12 to the wheel cylinders 5, 5a to effect energization of the front axle brakes 6, 6a. The supplied fluid pressure $P_1$ also flows from the inlet chamber 75 through the outlet port 30 and the conduit 13 to the split wheel cylinders 7, 7a to effect energization of the rear brakes 9, 9a substantially simultaneously with the energization of the front brakes 6, 6a. At the same time, the supplied fluid presure $P_2$ flows through the conduit 14 and the inlet port 29, the inlet chamber 77 and the outlet port 33 of the control valve 10 to the conduit 15 and therefrom to the split wheel cylinders 8, 8a of the rear brakes 9, 9a to effect energization thereof in response to the fluid pressure $P_2$ substantially simultaneously with their energization in response to the fluid pressure $P_1$, as previously described.

The supplied fluid pressure $P_1$ in the inlet chamber 75 of the control valve 10 acts on the comparator piston area $A_2$ to establish a force $P_1 A_2$, and the supplied fluid pressure $P_2$ in the inlet chamber 77 of said control valve acts on the centering piston area $A_1$ to establish a force $P_2 A_1$ in opposition to the force $P_1 A_2$ and urging the leftward end 43 of the centering piston 42 toward abutting or centering engagement with the housing shoulder 27 and the comparator piston shoulder 55. The fluid pressure $P_2$ also acts on the comparator piston area $A_3$ to establish a force $P_2 A_3$ in opposition to the force $P_1 A_2$ and additive to the force $P_2 A_1$. Since the sum of the areas $A_1$, $A_3$ is greater than the area $A_2$, as previously mentioned, the additive forces $P_2 A_1$, $P_2 A_3$ are greater than the opposing force $P_1 A_2$ to normally obviate rightward translatory movement of the comparator piston 47 from its centered or normal operating position. Further, since the force $P_2 A_1$ urges the centering piston 42 into engagement with the housing shoulder 55, it is apparent that the force $P_1 A_2$ is greater than the force $P_2 A_3$ to normally oppose leftward translatory movement of the comparator piston 47 from its centered position since, as previously mentioned, the area $A_2$ is greater than the area $A_3$.

Figure 4:
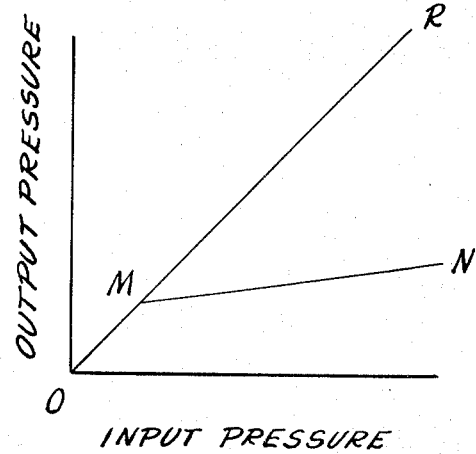
FIG. 4 is a graphical representation illustrating the applied or output fluid pressure effected by the control valve of FIG. 2 in response to the supplied or input fluid pressure.

The line OR in the graph of FIG. 4 illustrates the normal braking operation or range, as previously discussed, wherein the supplied fluid pressures $P_1$, $P_2$ at the inlet ports 28, 29 of the control valve 10 are substantially equal to the applied fluid pressure Po at the outlet port 38 unless the proportioning valve 59 is operative to proportionally reduce the applied fluid pressure Po under preselected conditions, as discussed hereinafter and as illustrated by the line MN in the graph of FIG. 4. During the normal braking operation, the applied fluid pressure Po in the outlet chamber 71 which is equal to the supplied fluid pressure $P_1$ acts on the area $A_4$ of the proportioning valve 59 to establish a rightwardly directed or closing force Po $A_4$, and the supplied fluid pressure $P_2$ in the inlet chamber 77 acts through the comparator piston bore and counterbore 56, 57 on the area $A_4$ of said proportioning piston to establish a leftwardly directed force $P_2 A_4$ which is substantially equal and opposite to the force Po $A_4$; therefore, since the forces Po $A_4$, $P_2 A_4$ are substantially equal and opposite, the proportioning valve 59 is inoperative during such normal braking applications, and the compressive force Fc of the metering spring 69 which is additive to the force $P_2 A_4$ maintains said proportioning valve in its inopertive or non-metering position, as shown.

In the event of the failure of the supplied fluid pressure $P_2$ due to leaks in the system branch 3 or a malfunctioning master cylinder 4 or the like, the force $P_2 A_4$ acting on the proportioning piston 59 is eliminated wherein the area $A_4$ becomes, for all practical purposes, an atmospheric area. Upon the failure of the supplied fluid pressure $P_2$, the supplied and applied fluid pressures $P_1$, Po are substantially equal through the range OM in the graph of FIG. 4, and when the magnitude of the now unopposed closing force Po $A_4$ attains a value substantially equal to or slightly greater than the force Fc of the metering spring, the closing force Po $A_4$ is effective to move the proportioning piston 59 from its normal or inoperative position in a rightward direction toward an operative or isolating position to initially engage the proportioning piston valve member 63 with the seating member valve seat 71 closing the seating member aperture 70 and interrupting pressure fluid communication therethrough between the control valve inlet and outlet ports 28, 38; therefore, in this manner, the supplied fluid pressure $P_1$ is isolated from the applied fluid pressure Po. Of course, the magnitude of the supplied fluid pressure $P_1$ at which the closing force Po $A_4$ is effective to move the proportioning piston 59 to its isolating position defines the "break out" point or knee point of said proportioning piston as shown by the point M on the line OR in the graph of FIG. 4. Upon the movement of the proportioning piston 59 to its isolating position and further increases in the supplied fluid pressure $P_1$ in excess of the predetermined value M, the closing force Po $A_4$ is replaced by an output force Po $A_5$ defined by the output fluid pressure Po acting on the area $A_5$, and the input fluid pressure $P_1$ acts on an input area $A_5-A_4$ which is less than and opposed to the output area $A_5$ to establish an input force $P_1(A_5-A_4)$ which is additive to and assists the proportioning spring force Fc.

It is obvious that further increases in the supplied fluid pressure $P_1$ in excess of the predetermined value M, as illustrated by the line MR in the graph of FIG. 4, will result in proportionally reduced or metered increases in the applied fluid pressure Po, as illustrated by the line MN in the graph of FIG. 4. For instance, when the supplied fluid pressure $P_1$ is further increased to a value in excess of the predetermined value M, the input force $P_1(A_5-A_4)$ is correspondingly increased and additive to the proportioning spring force Fc to overcome the opposing output force Po $A_5$; therefore, the proportioning piston 59 is moved leftwardly toward a metering position disengaging the proportioning piston valve member 63 from the seating member valve seat 71 to open the seating member aperture 70 and effect a metered or modulated application therethrough of the increased supplied fluid pressure $P_1$ which establishes a proportioned or ratioed increase in the applied fluid pressure Po, as shown by the line MN in the graph of FIG. 3, wherein: Po = $(P_1 (A_5-A_4) + Fc)/A_s$.

Of course, the increased applied fluid pressure Po effects a corresponding increase in the output force Po $A_5$, and when the increased output force Po $A_5$ attains an increased magnitude substantially equal to that of the additive input and spring forces $P_1(A_5-A_4)$ and Fc, the proportioning piston 59 is again moved rightwardly to re-position the valve member 63 thereof in lapped engagement with the seating member valve seat 71 closing the seating member aperture 70 to again isolate the supplied and applied fluid pressures $P_1$, Po. It is, of course, obvious that the proportioning piston 59 will be responsive to further increases in the supplied fluid pressure $P_1$ to effect further proportional increases in the applied fluid pressure Po, in the same manner as previously described, but only when the supplied fluid pressure $P_2$ has failed.

Upon the failure of the supplied fluid pressure $P_2$, the forces $P_2 A_1$, $P_2 A_3$ acting on the centering and comparator pistons 42, 47, respectively, are also eliminated, and the force $P_1 A_2$ acting on said comparator piston is effective to concertedly move said comparator and centering pistons to a rightward translatory position engaging the comparator piston rightward end 52 with the closure member shoulder 34. Upon the rightward translatory movement of the comparator piston 47, the camming surface 49 thereof is drivingly engaged with the switch operating member 50 of the electrical switch 17 to effect movement thereof upwardly in the housing cross-bore 40 toward a circuit making position wherein the electrical circuit 16 is energized causing current flow through the lead 19 from the battery 21 to energize the warning device 20 and thereby warn the vehicle operator of the failure of the system branch 3.

When the split system master cylinder 4 is deactuated, the supplied fluid pressure $P_1$ is vented to atmosphere which eliminates the force $P_1 A_2$ acting on the comparator piston 47 and the input force $P_1(A_5-A_4)$ acting on the proportioning piston 59. Upon the elimination of the supplied fluid pressure $P_1$, the output fluid pressure Po acting on the seating member 64 displaces the lip 73 thereof from sealing engagement with the housing counterbore 24, and in this manner, the applied fluid pressure Po returns from the outlet port 38 through the outlet chamber 76, the plurality of return flow passages 74 in said seating member, and between the displaced lip thereof and said housing counterbore to the inlet chamber and port 75, 28. When the applied fluid pressure Po is so reduced to correspondingly reduce the output force Po $A_5$ to a value less than that of the proportioning spring force Fc, the proportioning spring 69 moves the proportioning piston 59 leftwardly to its original position re-engaging the free end 66 thereof with the closure member shoulder 39 and displacing the proportioning piston valve member 63 from the seating member valve seat 71 to open the seating member aperture 70 and again re-establish open pressure fluid communication therethrough between the inlet and outlet ports 28, 38 thereby effecting the complete elimination of the applied fluid pressure Po. Of course, upon the elimination of the supplied and applied fluid pressures $P_1$, Po, it is obvious that the front and rear brakes 6, 6a, and 9, 9a are de-energized and the respective wheel cylinders 5, 5a and 7, 7a thereof de-actuated. When the system branch 3 is repaired and its fluid pressure integrity restored, the subsequent re-establishment of the supplied fluid pressures $P_1$, $P_2$ results in the re-establishment of the forces $P_2 A_1$, $P_2 A_3$ acting on the centering and comparator pistons 42, 47, respectively, to drive said centering and comparator pistons toward their original positions, as previously described, against the force $P_1 A_2$ acting on said comparator piston.

In the event of the failure of the supplied fluid pressure $P_1$ due to leaks or the like in the system branch 2 or a malfunction in the master cylinder 4, the modulating or metering operation of the proportioning valve 59 is, of course, obviated, and the force $P_2 A_3$ acting on the comparator piston 47 effects movement thereof toward its leftwardly translated position engaging the comparator piston leftward end 53 with the shoulder 67a provided on the proportioning piston 59. The movement of the comparator piston 47 toward its leftwardly translated position drivingly engages the camming surface 49a with the operating member 50 of the electrical switch 17 to effect energization of the electrical circuit 16 in the same manner as previously described hereinbefore to energize the warning device 20 and thereby warn the vehicle operator of the failure of the system branch 2.

Figure 5:
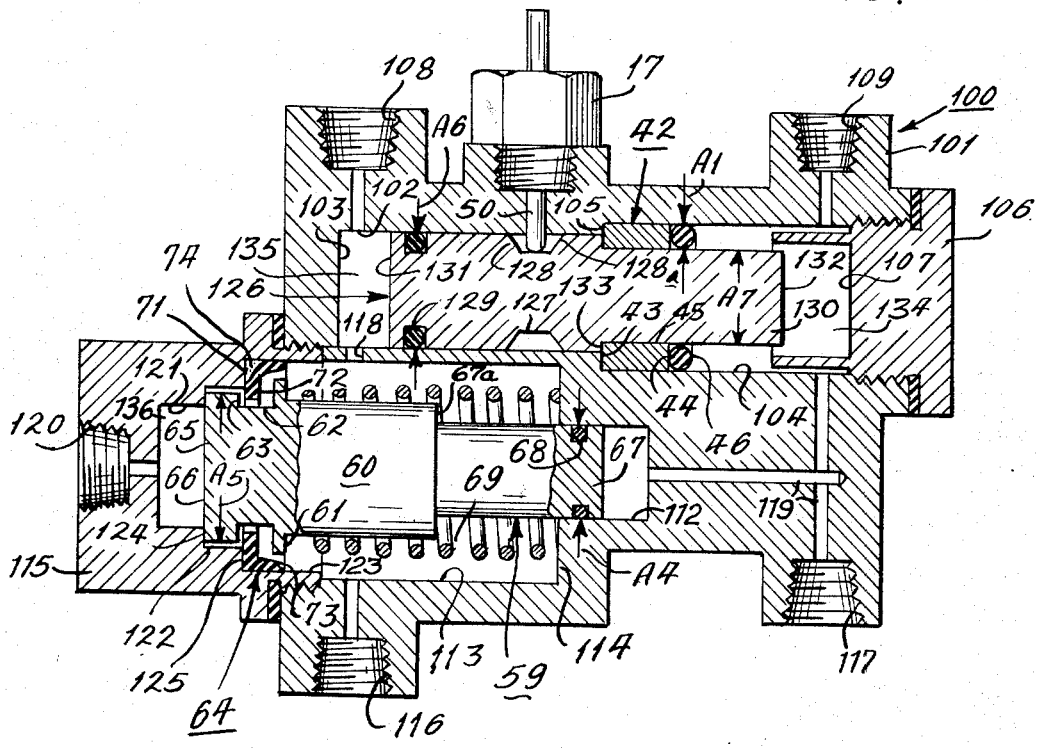
FIG. 5 is a sectional view illustrating an alternative construction of a control valve for use in the system of FIG. 1 also embodied in the present invention in cross-section.

Referring now to FIG. 5, another control valve 100 is shown having substantially the same component parts and functioning in the above described system 1 in substantially the same manner as the control valve 10 with the following exceptions.

The control valve 100 is provided with a housing 101 having an upper blind bore 102 with an end wall 103, and said blind bore is axially aligned with a counterbore 104 having an annular shoulder or abutment 105 therebetween. The rightward or open end of the counterbore 104 is closed by a closure member or end plug 106 which is threadedly received in said counterbore having an interior or abutment end 107. A pair of inlet ports 108, 109 which receive the conduits 11, 14, as previously mentioned, are provided in the housing 101 intersecting with the bore and counterbore 102, 104, and a cross-bore 110 is also provided in the housing 101 having one end intersecting with the housing bore 102 and the other end thereof connecting with a threaded cross-counterbore 111 in which is threadedly received the electrical switch 17.

The housing 101 is also provided with a lower bore 112 which is axially aligned with a counterbore 113 having an annular shoulder or abutment 114 interposed therebetween, and another closure member 115 is threadedly received in the leftward or open end of said counterbore. Outlet ports 116, 117 which receive the conduits 13, 15, as previously mentioned, are also provided in the housing 101 intersecting with the counterbores 113, 104, respectively, and passages 118, 119 are provided in said housing between the bore 102 and counterbore 113 and between the bore 112 and the outlet port 117, respectively. The closure member 115 is provided with another outlet port 120 which receives the conduit 12, as previously mentioned, and said outlet port is connected with a bore 121 which is axially aligned with stepped counterbores 122, 123. Annular shoulders or abutments 124, 125 are provided on the closure member 115 between the bore and counterbore 121, 122 and the counterbores 122, 123, respectively.

The seating member 64, as previously described, has its side 71 in seating engagement with the closure member shoulder 125, and the lip 73 of said seating member is sealably engaged with the closure member counterbore 123. The proportioning piston 59, as previously described, has its extensions 65, 67 slidably and guidably received in the closure member counterbore 122 and the housing bore 112, respectively, and the proportioning piston seal 68 is sealably engaged with said housing bore 112 while the free end 66 of said proportioning piston is urged into abutting engagement with the closure member shoulder 124 which defines the inoperative or non-metering position of said proportioning piston. The centering piston 42 and its O-ring seal 46 is slidably received in the housing counterbore 104 with the centering piston leftware end 43 normally engaged with the housing shoulder 105.

A comparator means, such as the reciprocal switch actuating member or piston indicated generally at 126, is slidably received in the housing upper bore 102, and an annular or peripheral groove means 127 is provided in the comparator piston 126 defining opposed driving or camming surfaces 128, 128a generally located immediately below the housing cross-bore 110 for driving engagement with the switch operating member 50 of the electrical switch 17 upon the translatory or reciprocating movement of said comparator piston from its centered or normal operating position, as shown. A sealing member or O-ring 129 is provided on the comparator piston 126 in sealing engagement with the housing bore 102, and said comparator piston is provided with a reduced extension 130 integrally formed therewith which is slidably received in the bore 45 of the centering piston 42 and sealably extends through the centering piston seal 46. The comparator piston 126 is provided with opposed leftward and rightward free ends 131, 132 for abutting engagement with the housing end wall 103 and the closure member interior end 107, respectively, upon the translatory movement of said comparator piston, as discussed hereinafter. An annular shoulder or abutment 133 is defined on the comparator piston 126 about the reduced extension 130 thereof for driving or centering engagement with the leftward end 43 of the centering piston 42.

The housing counterbore 104 rightwardly of the centering piston seal 46 and the comparator piston 126 and the housing bore 112 rightwardly of the proportioning piston 59 which are interconnected by the passage 119 and the outlet port 117 define an inlet chamber 134 which is connected in open pressure fluid communication with the inlet port 109 at all times. Another inlet chamber 135 is defined between the sealing engagement of the proportioning piston valve member 63 with the seating member valve seat 71 and the housing shoulder 114 in the housing counterbore 113 which is connected by the passage 118 to the portion of the housing bore 102 leftwardly of the comparator piston 126 therein, and said inlet chamber is connected in open pressure fluid communication with the inlet port 108 at all times. An outlet chamber 136 is provided in the closure member bore and counterbore 121, 122 between the sealing engagement of the proportioning piston valve member 63 with the closure member valve seat 71 and the end wall of said bore, and said outlet port is connected in open pressure fluid communication with the outlet port 120 at all times.

It should be noted that the comparator piston 126 is provided with an annular effective area $A_6$ on the leftward end 131 thereof defined between the sealing engagement of the proportioning piston seal 129 with the housing bore 102, and the area $A_6$ is subjected to the fluid pressure in the inlet chamber 125 at all times. Another effective area $A_7$ which is opposed to the area $A_6$ and additive to the area $A_1$ of the centering piston 42 is provided on the rightward end 132 of the comparator piston 126 defined by the sealing engagement of the comparator piston extension 130 with the centering piston seal 46. The area $A_6$ is greater than the area $A_7$, and the sum of the areas $A_7$ and $A_1$ is greater than the area $A_6$.

Assuming that the component parts of the system 1 and control valve 100 to be in their normal operating positions, manual operation of the split system master cylinder 4 creates input or supplied fluid pressures $P_1$, $P_2$ which are transmitted through the conduits 11, 14 to the inlet ports and chambers 108, 135 and 109, 134 of the control valve 100, and the supplied fluid pressure $P_1$ establishes an output or applied fluid pressure Po in the outlet port and chamber 120, 136 of said control valve which is transmitted therefrom through the conduit 12 to the wheel cylinders 5, 5a to effect energization of the front axle brakes 6, 6a. The supplied fluid pressure $P_1$ also flows from the inlet chamber 135 through the outlet port 116 and conduit 13 to the split wheel cylinders 7, 7a to effect energization of the rear brakes 9, 9a substantially simultaneously with the energization of the front brakes 6, 6a. At the same time, the supplied fluid pressure $P_2$ flows from the inlet chamber 134 through the outlet port 117 and conduit 15 to the split wheel cylinders 8, 8a of the rear brakes 9, 9a to effect energization thereof substantially simultaneously with their energization and response to the fluid pressure $P_1$, as previously described.

The fluid pressure $P_1$ in the inlet chamber 135 of the control valve 100 acts on the comparator piston $A_6$ to establish a force $P_1 A_6$, and the supplied fluid pressure $P_2$ in the inlet chamber 134 acts on the centering piston area $A_1$ to establish the force $P_2 A_1$ in opposition to the force $P_1 A_6$ in urging the centering piston leftward end 43 toward abutting or centering engagement with the housing shoulder 105 and the comparator piston shoulder 133. The fluid pressure $P_2$ also acts on the comparator piston area $A_7$ to establish a force $P_2 A_7$ in opposition to the force $P_1 A_6$, and since, as previously mentioned, the sum of the areas $A_1$, $A_7$ is greater than the area $A_6$, the additive forces $P_2 A_1$, $P_2 A_7$ are greater than the opposing force $P_1 A_6$ to normally obviate rightward translatory movement of the comparator piston 126 from its centered or normal operating position. Further, since the force $P_2 A_1$ urges the centering piston 42 into engagement with the housing shoulder 105, it is apparent that the force $P_1 A_6$ is greater than the force $P_2 A_7$ to normally oppose leftward translatory movement of the comparator piston 126 from its centered position since, as previously mentioned, the area $A_6$ is greater than the area $A_7$.

As previously mentioned during the normal braking operation as illustrated by the line OR in the graph of FIG. 3, the applied fluid pressure Po in the outlet chamber 136 is equal to the supplied fluid pressure $P_1$ and acts on the area $A_4$ of the proportioning valve 59 to establish the rightwardly directed or closing force Po $A_4$, and the supplied fluid pressure $P_2$ in the inlet chamber 134 also acts on the area $A_4$ of said proportioning piston to establish the leftwardly directed force $P_2 A_4$ which is substantially equal and opposite to the force Po $A_4$; therefore, since the forces Po $A_4$, $P_2 A_4$ are substantially equal and opposite, the proportioning valve 59 is inoperative during the normal braking applications, and the compressive force of the metering spring 69 which is additive to the force $P_2 A_4$ maintains said proportioning valve in its inoperative or non-metering position, as shown.

In the event of the failure of the supplied fluid pressure $P_2$ due to leaks in the system branch 3 or a malfunctioning master cylinder 4 or the like, the force $P_2 A_4$ acting on the proportioning piston 59 is eliminated wherein the area $A_4$ becomes, for all practical purposes, an atmospheric area, as previously mentioned. With the force $P_2 A_4$ so eliminated, the proportioning piston is generally operable under preselected conditions to effect a proportional reduction in the applied fluid pressure Po at the outlet port 120 in the same manner as previously described with respect to the control valve 10.

Of course, upon the failure of the supplied fluid pressure $P_2$ the forces $P_2 A_1$, $P_2 A_7$ acting on the centering and comparator piston 42, 126, respectively, are also eliminated, and the force $P_1 A_6$ acting on said comparator piston is effective to concertedly move said comparator and centering pistons to a rightwardly translated position engaging the comparator piston rightward end 132 with the closure member interior end 107. This rightward translatory movement of the comparator piston 126 drivingly engages the camming surface 128 thereof with the switch operating member 50 of the electrical switch 17 to effect the actuation thereof and the energization of the electrical circuit 16, as previously described, to energize the warning device 20 and thereby warn the vehicle operator of the failure of the system branch 3.

When the system branch 3 is repaired and its fluid pressure integrity restored, the subsequent reestablishment of the fluid pressures $P_1$, $P_2$ results in the reestablishment of the forces $P_2 A_1$, $P_2 A_7$ acting on the centering and comparator pistons 42, 126, respectively, to drive said centering and comparator pistons toward their original positions, as previously described, against the force $P_1 A_6$ acting on said comparator piston.

In the event of the failure of the supplied fluid pressure $P_1$ due to leaks or the like in the system branch 2 or a malfunction in the master cylinder 4, the modulating or metering operation of the proportioning valve 59 is, of course, obviated, and the force $P_2 A_7$ acting on the comparator piston 126 effects movement thereof toward its leftwardly translated position engaging the comparator piston leftward end 31 with the housing end wall 103. The movement of the comparator piston 126 toward its leftwardly translated position drivingly engages the camming surface 128a thereof with the operating member 50 of the electrical switch 17 to effect the actuation thereof and the energization of the electrical circuit 16, in the same manner as previously described hereinbefore, to energize the warning device 20 and thereby warn the vehicle operator of the failure of the system branch 2.

From the foregoing, it is now apparent that a novel system 1 and control valves 10, 100 meeting the objects and advantageous features set out hereinbefore, as well as others, are provided, and changes or modifications as to the precise connections, configurations, shapes and details set forth in this disclosure by way of illustration may be made by those skilled in the art without departing from the spirit of the invention.

The embodiments of the invention in which an exclusive property or privilege is claimed are defined as follows:

1. A brake system comprising a pair of brakes, means for normally supplying separate fluid pressures to said brakes for effecting energization thereof, one of said brakes being subjected to one of the supplied fluid pressures and the other of said brakes being subjected to the one and the other of the supplied fluid pressures, and a proportioning valve for performing proportioning operations on the one supplied fluid pressure under preselected conditions including an effective area for respective subjection to the one and other supplied fluid pressures, said proportioning valve being inoperable in said system when the supplied fluid pressures acting on said area are substantially equal and being operable generally to effect a reduced application to said one brake of the one supplied fluid pressure only in the event of the failure of the other supplied fluid pressure.

2. A brake system according to claim 1, wherein said proportioning valve includes resiliently urged means, said resiliently urged means being movable against its own force in response to the one supplied and applied fluid pressures of a predetermined value acting on said area toward a position in said housing isolating the one supplied and applied fluid pressures and said resiliently urged means being thereafter further movable assisted by its own forces in response to increases in the one supplied fluid pressure in excess of the predetermined value toward a metering position in said housing effecting a metered increase in the applied fluid pressure in a predetermined ratio with the increased one supplied fluid pressure in excess of the predetermined value only in the event of the failure of the other supplied fluid pressure acting on said area.

3. A brake system according to claim 2, wherein said resiliently urged means includes piston means movable in said housing, said area being on said piston means, spring means engaged with said piston means, said piston means being movable against said spring means in response to the one supplied and applied fluid pressures of the predetermined value acting on said area toward the isolating position only upon the failure of the other supplied fluid pressure acting on said area, and another area on said piston means for subjection to the applied fluid pressure, said piston means being movable assisted by said spring means and against the applied fluid pressure acting on said other area toward the metering position in response to the one supplied fluid pressure in excess of the predetermined value acting on the difference between said first named and other areas when the other supplied fluid pressure has failed.

4. A brake system according to claim 3, wherein said first named means includes a dual master cylinder housing one and other supply fluid pressure generating chambers therein, said dual master cylinder being generally operable to establish the one and other supplied fluid pressures in said brake system.

5. A brake system according to claim 4, wherein said other brake includes split wheel cylinder portions respectively subjected to the one and other supplied fluid pressures for energizing said other brake, and another wheel cylinder on said front brake subjected to the applied fluid pressure for energizing said front brake.

6. A brake system according to claim 1, comprising other means for comparing the magnitudes of the supplied fluid pressures and movable between a normal position and one of opposed translated positions upon the failure of one of the one and the other of the supplied fluid pressures respectively acting thereon.

7. A brake system according to claim 6, comprising passage means in said other means between the one and other supplied fluid pressures, said proportioning valve including means movable in said passage means and defining therewith said area.

8. A dual brake system for a vehicle comprising a master cylinder having first and second supply fluid pressure generating chambers therein, at least one front axle brake and one rear axle brake on said vehicle, dual wheel cylinder means on said rear axle brake having dual fluid pressure responsive means therein for independently and concertedly energizing said rear axle brake, another wheel cylinder on said front axle brake for effecting energization thereof, first conduit means connecting said first chamber of said master cylinder in pressure fluid communication with said other wheel cylinder and one of said dual fluid pressure responsive means of said dual wheel cylinder means, second conduit means connecting said second chamber of said master cylinder in pressure fluid communication with the other of said dual fluid pressure responsive means of said dual wheel cylinder means, said master cylinder being generally operable to establish substantially equal fluid pressures in said first and second chambers supplied through said first and second conduit means and applied to said other wheel cylinder and said one fluid pressure responsive means and to the other fluid pressure responsive means to energize said front and rear axle brakes, respectively, control means connected in parallel in said first and second conduit means between said front and rear axle brakes including a proportioning piston for controlling the application through said first conduit means to said other wheel cylinder of the supplied fluid pressure from said first chamber, spring means engaged with said proportioning piston, an effective area on said proportioning piston for respective subjection to the supplied fluid pressures in said first and second conduit means, said proportioning piston being immovable in said housing in response to the supplied fluid pressures in said first and second conduit means acting on said area, another area on said proportioning valve for subjection to the applied fluid pressure in said first conduit means, said piston means being movable in said housing against said spring means in response to the supplied and applied fluid pressures in said first conduit means in excess of a predetermined value acting on said first named area toward a position in said housing isolating the supplied and applied fluid pressures in said first conduit means and said proportioning piston being thereafter further movable assisted by said spring means in response to the supplied fluid pressure in excess of a predetermined value in said first conduit acting on the difference between said first named and other areas toward a metering position in said housing effecting a metered increase in the applied fluid pressure acting on said other area in a predetermined ratio with the increased supplied fluid pressure in excess of the predetermined value only when the supplied fluid pressure in said second conduit means acting on said first named area has failed.

9. A brake system according to claim 8, comprising comparator piston means in said control means for comparing the magnitudes of the supplied fluid pressures in said first and second conduit means and movable between a normal position and one of opposed translated positions upon the failure of the supplied fluid pressure in one of said first and second conduit means acting thereon.

10. A brake system according to claim 9, comprising passage means in said comparator piston means between said first and second conduit means, and said proportioning piston including means movable in said passage means and defining with said comparator piston means said first named area.

11. A brake system according to claim 10, comprising an electrical circuit having a warning device therein adapted for actuation upon the completion of said electrical circuit, switch means in said control means normally interrupting said electrical circuit, and said switch means including actuating means for driven engagement with said comparator piston, said actuating means being driven toward a position in said switch means to complete said electrical circuit and energize said warning device in response to the translatory movement of said comparator piston means toward its translated positions.

12. A control valve comprising a housing, a proportioning valve movable in said housing for preforming proportioning operations on one of separate fluid pressures supplied thereto under preselected conditions to effect the application through said housing of a proportionally reduced applied fluid pressure including an effective area for respective subjection to both of the supplied fluid pressures, said proportioning valve being inoperable when said area is subjected to both of the supplied fluid pressures and being operable generally in response to the one supplied fluid pressure in excess of the predetermined value acting on said area to effect a reduced application through said housing of the one supplied fluid pressure and establish the proportionally reduced applied fluid pressure only in the event of the failure of the other of the supplied fluid pressures acting on said area.

13. A control valve according to claim 12, comprising means for comparing the magnitudes of the supplied fluid pressures and movable from a normal position toward one of opposed translated positions upon the failure of one of the one and other supplied fluid pressures.

14. A control valve according to claim 13, comprising passage means in said comparing means between the supplied fluid pressures, and said proportioning valve including means movable in said passage means and defining with said first named means said area.

15. A control valve according to claim 12, wherein said proportioning valve includes resiliently urged means, said resiliently urged means being initially movable against its own force in response to the one supplied and applied fluid pressure of the predetermined value acting on said area toward a position isolating said one supplied and applied fluid pressure, another area on said resiliently urged means greater than said first named area for subjection to the applied fluid pressure, said resiliently urged means being further movable assisted by its own force in response to increases in the one supplied fluid pressure in excess of the predetermined value acting on the difference between said first named and other area toward a metering position effecting a metered increase in the applied fluid pressure acting on said other area in a predetermined ratio with the increased one supplied fluid pressure but only in the event of the failure of the other supplied fluid pressure acting on said first named area.

16. A control valve comprising a housing having a pair of inlet ports and an outlet port, proportioning means movable in said housing for controlling pressure fluid communication between one of said inlet ports and said outlet ports including an effective area for respective subjection to the fluid pressures at said inlet ports, said proportioning means being initially movable in response to the fluid pressure at said one inlet port and outlet port in excess of a predetermined value acting on said area toward a position interrupting pressure fluid communication between said one inlet port and said outlet port and being thereafter further movable in response to increases in the fluid pressure at said one inlet port toward a position establishing metered pressure fluid communication between said one inlet port and said outlet port to effect a metered increase in the fluid pressure at said outlet port in a predetermined ratio with the increased fluid pressure at said one inlet port in excess of the predetermined value but only in the event of the failure of the fluid pressure at the other of said inlet ports acting on said area.

17. A control valve according to claim 16, comprising a valve seat in said housing between said one inlet port and said outlet port for engagement with said proportioning means, said proportioning means being movable into engagement with said valve seat in its pressure fluid communication interrupting position and being thereafter disengaged from said valve means upon the movement of said proportioning means toward its metered pressure fluid communication position.

18. A control valve according to claim 17, comprising valve means on said proportioning means for engagement with said valve seat, said valve means being movable into engagement with said valve seat upon the movement of said proportioning means to its pressure fluid communication interrupting position and said valve means being disengaged from said valve seat upon the movement of said proportioning means to its metered fluid pressure communication position.

19. A control valve according to claim 16, comprising comparator means for comparing the magnitudes of the fluid pressures at said inlet ports and movable in said housing between one of opposed translated positions in response to the failure of the fluid pressures at one of said one and other inlet ports, passage means in said comparator means between said inlet ports, and said proportioning means including means movable in said passage means and defining with said comparator means said area.

* * * * *